US 6,737,027 B1

(12) United States Patent
Myers

(10) Patent No.: US 6,737,027 B1
(45) Date of Patent: May 18, 2004

(54) CONVERTER WITH SHELL SIZED TO ENDPLATES

(75) Inventor: Stephen Joe Myers, Owosso, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/392,947

(22) Filed: Sep. 9, 1999

(51) Int. Cl.⁷ .............................. B01D 53/92; F01N 3/28
(52) U.S. Cl. ................... 422/179; 422/177; 422/180
(58) Field of Search .................. 422/171–172, 422/177, 179, 180, 221, 222

(56) References Cited

U.S. PATENT DOCUMENTS

| | | | | |
|---|---|---|---|---|
| 3,441,381 A | * | 4/1969 | Keith et al. ................. | 422/119 |
| 3,832,443 A | * | 8/1974 | Hass .......................... | 422/177 |
| 3,841,842 A | * | 10/1974 | Wiley ......................... | 422/179 |
| 3,854,888 A | * | 12/1974 | Frietzsche et al. ............ | 29/463 |
| 3,967,929 A | * | 7/1976 | Tamazawa et al. ......... | 422/109 |
| 4,043,761 A | * | 8/1977 | Gaysert et al. ............. | 422/179 |
| 4,155,980 A | * | 5/1979 | Santiago et al. ............ | 422/179 |
| 4,278,639 A | * | 7/1981 | Tadokoro et al. ........... | 422/171 |
| 4,413,392 A | * | 11/1983 | Otani et al. .................. | 29/890 |
| 4,432,943 A | * | 2/1984 | Musall et al. ................ | 422/179 |
| 4,581,206 A | * | 4/1986 | Otani et al. ................. | 422/171 |
| 4,969,264 A | * | 11/1990 | Dryer et al. ................ | 422/179 |
| 5,250,269 A | * | 10/1993 | Langer ....................... | 422/179 |
| 5,329,698 A | | 7/1994 | Abbott ........................ | 29/890 |
| 5,693,295 A | * | 12/1997 | Foster ......................... | 422/171 |

* cited by examiner

Primary Examiner—Hien Tran
(74) Attorney, Agent, or Firm—Jimmy L. Funke

(57) ABSTRACT

An exhaust systems converter comprising an endplates, with an annular rings, positioned around both annular sides of a catalyst, an intumescent mat support wrapped around the catalyst and the annular rings, and an oversized shell which is sized to the endplates and welded in place.

23 Claims, 3 Drawing Sheets

CONVERTER WITH SHELL SIZED TO ENDPLATES

TECHNICAL FIELD

The present invention relates to producing catalytic converters. More particularly, the invention relates to producing catalytic converters, the housing or canister of which is sized down onto endplates.

BACKGROUND OF THE INVENTION

Catalytic converters have been employed to catalyze exhaust gasses in vehicles for more than twenty years and have been manufactured in a number of ways. Catalytic converters play a critical role in ensuring that fuel rich gasses are converted down to acceptable levels, and not coincidentally, they are a comparatively expensive article within an exhaust system. The materials are expensive, and manufacture is labor intensive. Furthermore, design packages that increase durability and improve overall system performance for reductions in emissions are at a premium. Accordingly, methods of manufacture have been put forth in attempts to reduce manufacturing costs, while at the same time, increase durability and stabilize system performance.

One method of manufacturing catalytic converters is to provide a pre-made canister and stuff it with the catalyst substrate and the insulation/support pad. In this method the catalyst substrate is wrapped with an intumescent mat of a selected thickness and weight (various weights are employed for various applications and desired properties). Commonly, the wrapped substrate material will create an assembly having outer dimensions that measure about 8 mm larger than the inside dimensions of the converter shell or canister. The assembly as described is then forced through a reduction cone and into the converter shell. Up to 20,000 lbs. of pressure can be required to accomplish the insertion of the assembly into the can. The method is costly.

A commonly preferred method for producing a catalytic converter is known as "the tourniquet method". The tourniquet method dispenses with the reducing cone and thus avoids the high insertion pressures on the substrate and mat materials. The method places the substrate and mat assembly into a canister open on one longitudinal edge. The canister is closed around the assembly by straps and compressed to the desired size. The open ends of the canister will, in this position, be overlapping and then are welded together. This method is also expensive and labor intensive. Further, due to this overlap, engineering design consideration must be given to the space alteration inside the canister due to the overlapped edge. The overlapped edge causes a mat density change in the local area of the overlap. This is a further cost addition.

U.S. Pat. No. 4,969,264 to Dryer et al. further describes a conventional catalytic converter with a reduced central housing section that compresses a support mat around a substrate. This method utilizes end bushings securely affixed to the housing body. Such converters are also expensive and labor intensive in manufacture.

Accordingly, there remains a need in the art for a catalytic converter that is easily and inexpensively manufactured, that increases durability, stabilizes system performance, and does not restrict design choice.

SUMMARY OF THE INVENTION

The drawbacks and disadvantages of the prior art are overcome by the catalytic converter of the present invention and its method of manufacture, the catalytic converter comprising: a catalyst; a first endplate, having an annular ring positioned around a portion of a first annular end of said catalyst; a second endplate, having an annular ring positioned around a portion of the second annular end of said catalyst; a mat support, covering said catalyst and the annular rings of said endplates; and a shell, covering and in close contact with the combined catalyst, mat support, and endplates.

The catalytic converter of the present invention is constructed by the method comprising: providing a first endplate having an annular ring; providing a second endplate having an annular ring; providing a catalyst; positioning the annular rings of said first and second endplates over each of the annular ends of said catalyst; covering said catalyst and the annular rings of said first and second endplates with a mat support; providing over said mat support and said endplates an oversized shell; and sizing down said oversized shell over said mat support and said endplates such that the shell is in close contact with said mat support and said endplates.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which.

DESCRIPTION OF THE PREFERRED EMBODIMENT

The present invention provides an effective procedure for manufacture of a catalytic converter with an end plate design incorporating full insulation of end plenum areas. Such insulation serves dual purposes. First, end plenum insulation conserves heat such that the operating temperature for the catalyst substrate is more easily obtained and maintained. Second, end plenum insulation reduces operating skin temperature, thereby precluding heat damage to parts external to the insulating material. As a further benefit, the device is readily manufactured using inexpensive components and providing a simple package with long durability.

Figure 1:
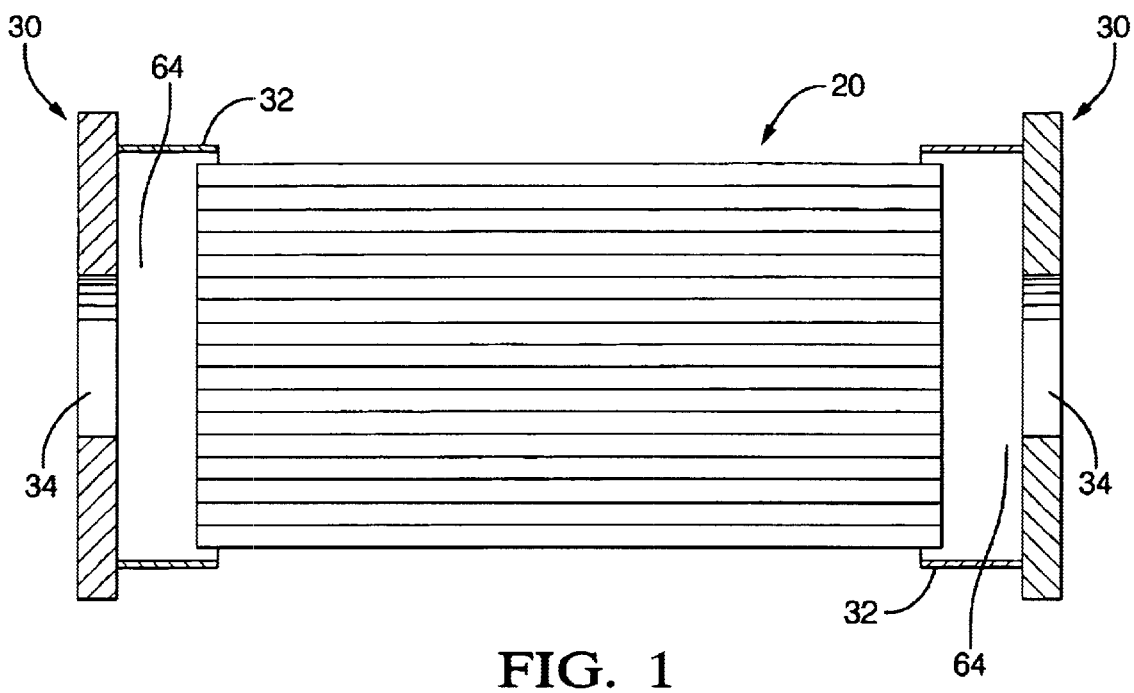
FIG. 1 is a cross sectional side view of the end plates as they are assembled to a catalyst substrate.

Referring in part to FIG. 1, catalyst substrate 20 is shown. Catalyst substrate, which may be any high temperature material, such as ceramic, metallic foils, combinations thereof, and other materials with ceramic preferred, is formed to provide a great number of gas passages coated with appropriate catalyst material. (As used herein, the term "high temperature material" refers to materials which are designed for use in a spark ignition or diesel engine environment, where temperatures are about 300° C. to about 1000° C.) The surface area of the substrate should be sufficient to support a sufficient amount of catalyst to effectively catalyze fuel rich gas streams flowing therethrough, with the surface area being a function of the surface design of gas passages, the volume of the substrate, and the effective density of the substrate. These parameters may be adjusted according to design needs, taking into account both the desired shape of the catalytic converter and optimal paths for exhaust gas flow.

Thus, exhaust gas is catalytically treated as it flows through the substrate material within the catalytic converter. The substrate 20 may contain any catalyst material sufficient to convert fuel rich gasses to acceptable levels as is known in the art. Preferably, substrate 20 is coated with three-way catalysts to convert nitrous oxides, carbon monoxide, and hydrocarbons to nitrogen, water, and carbon dioxide. Optionally, the substrate 20 may contain an oxidation catalyst.

Figure 2:
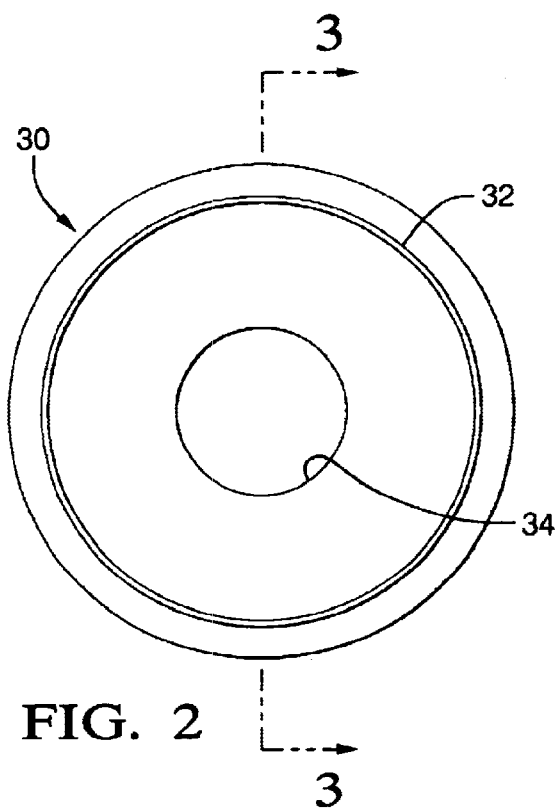
FIG. 2 is a cross sectional view of an end plate with a tack welded annular ring.
Figure 3:
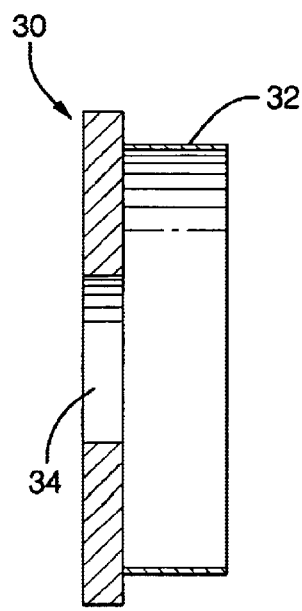
FIG. 3 is an overhead view of an end plate with a tack welded annular ring.

FIGS. 2 and 3 show exemplary end plates 30 with optional annular rings 32, which are to be secured around the annular ends of the catalyst substrate (shown in FIG. 1), and annular opening 34 for passage of exhaust gasses. End plates 30 may be of any type or design. Primarily, the shape of the end plates should be compatible with the final shape of the catalytic converter, which, due to ease of manufacture and reduced costs, is preferably cylindrical. However, as discussed above, the shapes of the catalytic converter and substrate may be adjusted to fit particular system needs and to effect particular gas flow design. As such, the present invention contemplates that the endplates, substrate, and shell of the catalytic converter may be any practicable shape.

End plates 30 may be any practicable shape, including simple ring type inner cones (not shown), which are common in the art, as long as they are compatible with the final shape of the catalytic converter. Specifically, such end plates must be able to secure tightly to the converter housing. This may be done by simple size reduction of an oversized shell 50 to a converter assembly including such end plate, or preferably by holding such end plate to the catalyst substrate by a securing mechanism (or annular ring) 32. Securing of the endplates to the catalyst substrate can be effected by the securing mechanism 32, which is permanently affixed to the end plates.

The particularly preferred structural support for securing an end plate 30 to a substrate 20 prior to size reduction of an outer shell 50 to the assembly is a securing mechanism 32 affixed to an inner side of the end plate. The securing mechanism 32 is made of a material suitable for use in high temperature environments and is of a diameter greater than that of the catalyst substrate 20. This allows for the securing mechanism 32, which can have any appropriate geometry such as annular, conical, cylindrical or other, to extend around an annular end portion of the substrate 20, as is shown in FIG. 1, forming a gas shield to protect optional insulation material in the annulus of the end plenum 64.

While the end plates are preferably of a ring type, any similar design that allows for at least a partial securing of the end plate 30 to the substrate 20 would be suitable. For example, use of two or more posts (not shown), tack welded to the endplate, at least two of which extend around substantially opposite sides of an annular end of the substrate 20, would be suitable. Any such securing mechanism would be preferred over simple reduction of an oversized shell to the outer periphery of an end plate as was discussed above.

FIGS. 2 and 3 show a preferred shape and design for end plates used with the present invention. The catalytic converter design of the present invention advantageously allows for construction of a compact, cleanly assembled converter using the preferred, flat end plates. Each of these preferred endplates has, defined at any point within the plate, annular opening 34 for connection with exhaust piping (not shown) carrying exhaust gasses. Further, each endplate preferably has, welded or otherwise permanently affixed to an outer periphery of one side of the flat end plate, an annular ring 32. In this, annular ring 32 may be affixed to an endplate by any known method, but is preferably securely affixed by tack welding.

Further, while preferred embodiments of the present invention generally comprise a substrate in combination with two endplates, it is contemplated that assembly of a catalytic converter may be made using only one such end plate. When such is the case, the substrate, having one endplate and wrapped in a high temperature mat, is inserted into an oversized shell that is partially closed on one end (not shown). The oversized shell is then sized down onto the high temperature mat and the endplate to form the catalytic converter.

Figure 4:
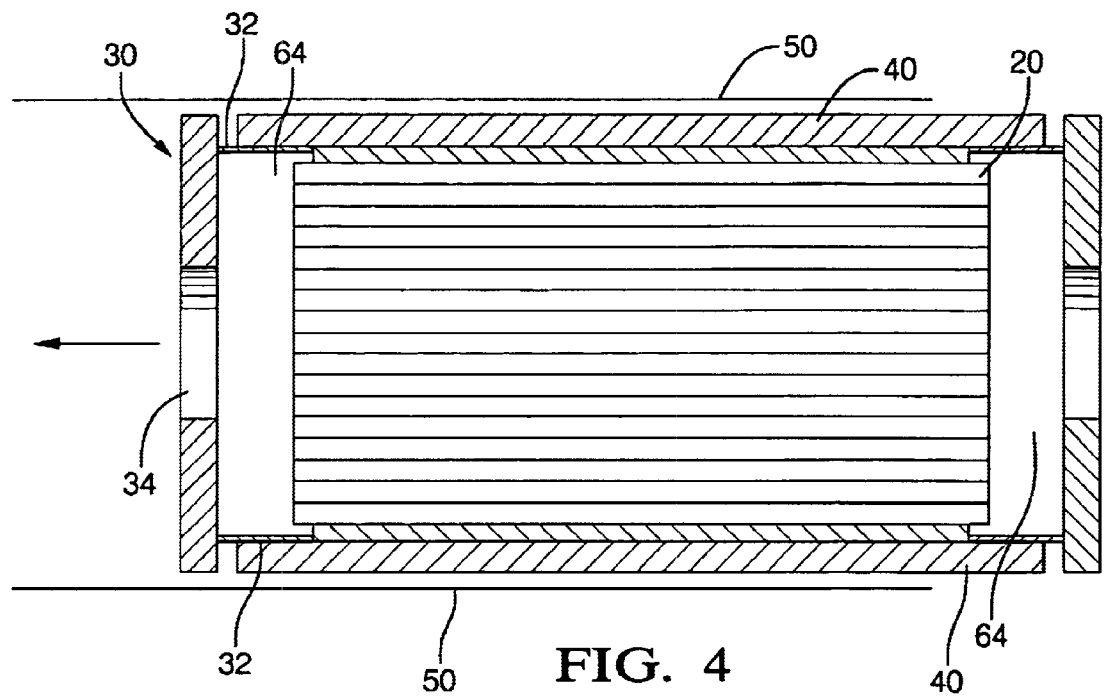
FIG. 4 is a cross sectional side view of the entire assembly (substrate, end plates, and mat) as it is inserted into an oversized shell.

The preferred securing of the endplate 30 to the substrate 20 is effected by wrapping an intumescent mat 40, shown in FIG. 4, around the catalytic substrate 20 and the annular rings 32, or similar securing mechanism, in one of a number of conventional mat wrapping procedures or new procedures. The wrapping procedure is not critical to functionality of the invention beyond the considerations that must be given to mat wrapping in current canning procedures such as density, uniformity, etc. More specifically, the mat is wrapped around the substrate to form a cylinder of material whose axis is the substantially the same as the substrate material. The mat material mounts the substrate, insulates the substrate from shock, and insulates the can from the heat of the substrate. The pressure placed on the mat and substrate should be of a sufficient amount to successfully hold the substrate and insulate it from shock.

Where the preferred end plate support mechanism (or annular ring) 32 is used, the mat 40 is wrapped over at least the portion of the support mechanism 32 extending around the annular end of the substrate 20 such that the mat 40 holds the extended portion between the mat and the substrate. This orientation functions to hold the end plates in a particular position and orientation prior to insertion of the wrapped assembly (substrate, end plates and mat) into an oversized shell 50.

The thickness of the intumescent mat 40 is not critical to the operation of the present invention. The mat may be as thick or as thin as may be desired by design choice, such that proper insulation is effected. Similarly, the particular type of mat 40 is not particularly critical to the operation of the present invention. Accordingly, the mat may be of any material commonly known and used as such in the art.

Intumescent mat 40 is preferably wrapped in a sufficient width to fully insulate end plenums 64 of the converter at operating temperatures thereby providing lifetime and durability to those portions of the converter. As such, intumescent mat 40 should, in the particularly preferred embodiment utilizing an annular ring 32, substantially cover all of the annular ring (shown in FIG. 4).

Figure 5:
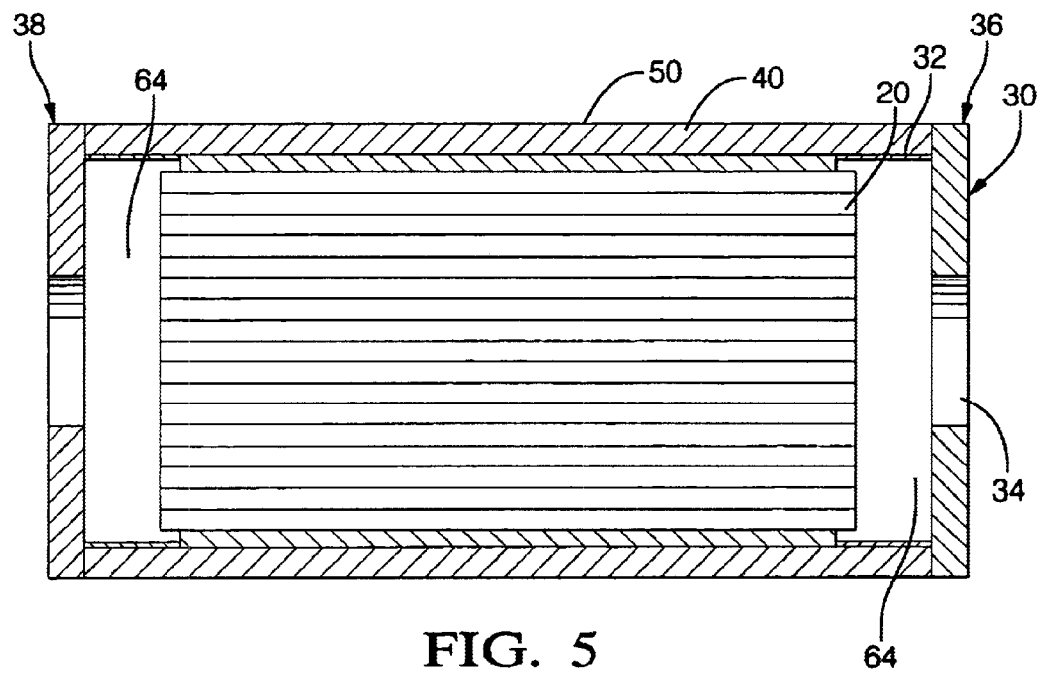
FIG. 5 is a cross sectional side view showing the oversized shell size reduced to the assembly (substrate, end plates, and mat)
Figure 6:
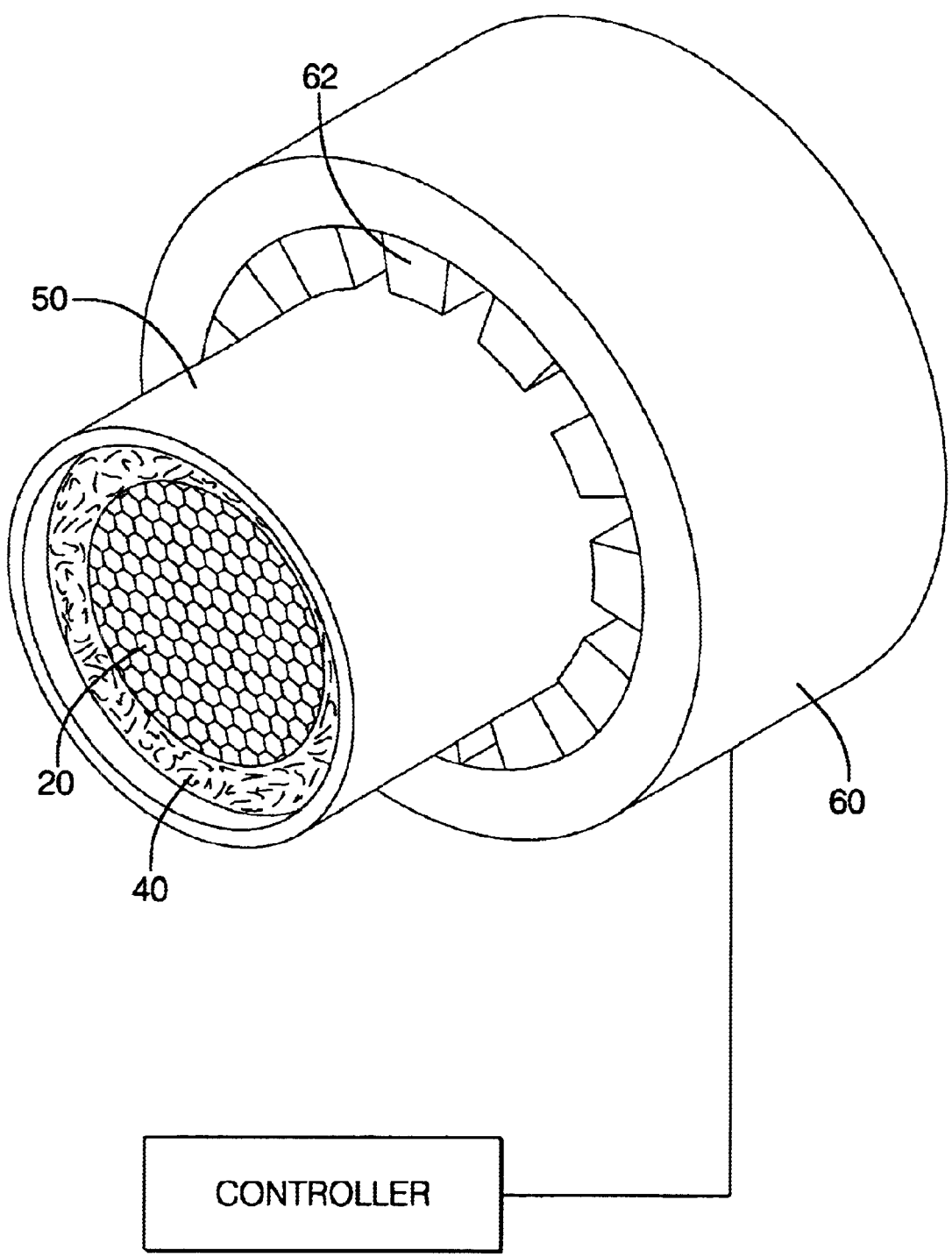
FIG. 6 is a schematic perspective illustration of the shell being size reduced.

Assembled substrate 20, end plates 30, and mat 40 may then be easily inserted into oversized shell 50, which has a length substantially the same as that of the assembly (shown in FIGS. 4 and 5). As shown in FIGS. 5 and 6, the shell is then reduced in size to the shape of end plates 30 using any of the methods commonly known in the art, such as that disclosed in U.S. Pat. No. 4,969,264 to Dryer et al. and in U.S. Pat. No. 5,329,698 to Abbott. This size reduction further presses the intumescent mat 40 against the substrate 20 and against any end plate support mechanisms 32 which may be present in preferred embodiments. Such size reduction also compressively seals the shell 50 to the outer periphery of the end plates 30.

Preferably, such reduction is performed by a conventionally available size reducing machine 60, such as is commonly employed in the construction of catalytic converters. As shown in FIG. 6, a machine having a plurality of reducer fingers 62 typically about 10 to 12 is preferably employed to produce even reduction and substantially uniform stress in the shell 50 and to thus create a substantially uniform compressive load on the substrate, mat, and end plates.

Shell 50 may then be welded along the end plate seam to ensure converter integrity. In order to facilitate welding or otherwise securing the shell 50 to the end plates, as can be seen in FIG. 5, the shell 50 preferably has a length less than the overall length of the catalytic converter. Essentially, the shell 50 preferably extends from point 36 on one end plate to point 38 on the opposing end plate. Points 36 and 38 can be located anywhere on the outer periphery of the end plates, with the points being disposed near the middle of the periphery typically preferred.

The weld may be made by any method as is known in the art, including by metal inert gas (MIG) weld or rollseam weld, with the use of rollseam welds being generally preferred due to advantages of lower cycle time and reduced consumables per weld.

The catalytic converter effectively overcomes a plurality of problems associated with conventional converters. Primary among these, the present converter design allows use of end plates or end cones having a smaller diameter or cross-section than the shell. Because of this, the design allows the end plates to be assembled prior to working with the outer shell, which further allows an insulating material of sufficient density to be placed around the end plenums of the converter. In contrast to the insulation of conventional converters, the present invention permits extension of insulation material beyond the face of the catalyst substrate, where such material effectively provides full insulation of the converter, including the end plenum areas, and increases converter life.

End plenum insulation serves dual purposes. Firstly, such insulation precludes temperature leak, such that the operating temperature for the catalyst substrate is more easily obtained. Secondly, end plenum insulation precludes heat damage to parts external to the insulating material.

The design advantages of the present converter also extend to reduce material costs and allow design flexibility. Elimination of the requirement that end plates be of a greater diameter than the shell translates to lower material costs. Similarly, elimination of this requirement translates to a reduction in the overall clearance requirements of the same converter. This means added design flexibility for typically cramped exhaust systems.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An exhaust system converter, comprising:
 a catalyst;
 a first endplate positioned adjacent to a first end portion of said catalyst, said first endplate defining a first extreme end of said converter and comprising a first endplate support mechanism extending perpendicularly therefrom toward said catalyst;
 a mat support substantially covering said catalyst and at least a portion of said first endplate support mechanism, wherein said first endplate support mechanism is disposed between said mat support and said catalyst; and
 a shell having a diameter greater than that of said first endplate, wherein said shell is disposed around said catalyst and said mat support, and is disposed around and in intimate contact with at least a portion of said first endplate.

2. The exhaust system converter of claim 1, wherein said first endplate support mechanism is positioned around said first end portion of said catalyst.

3. The exhaust system converter of claim 2, wherein said first endplate support mechanism is in the form of an annular ring.

4. The exhaust system converter of claim 3, wherein said annular ring is welded to said first endplate.

5. The exhaust system converter of claim 3, wherein said mat support substantially covers said catalyst and said annular ring.

6. The exhaust system converter of claim 1, further comprising a second endplate, positioned adjacent to an opposite, second end portion of said catalyst, wherein said shell is disposed around and in intimate contact with said second endplate.

7. The exhaust system converter of claim 6, wherein said second endplate incorporates a second endplate support mechanism, and wherein said second endplate support mechanism is positioned around a second annular end portion of said catalyst.

8. The exhaust system converter of claim 7, wherein said second endplate support mechanism is in the form of an annular ring.

9. The exhaust system converter of claim 8, wherein said annular ring is welded to said second endplate.

10. The exhaust system converter of claim 8, wherein said mat support substantially covers said catalyst and said annular ring.

11. The exhaust system converter of claim 1, wherein said catalyst comprises a three-way catalyst.

12. The exhaust system converter of claim 1, wherein said catalyst comprises an oxidation catalyst.

13. The exhaust system converter of claim 1, said shell is disposed around and in intimate contact with an entire periphery of said first endplate.

14. The exhaust system converter of claim 1, wherein said mat support extends beyond a face of said catalyst.

15. The exhaust system converter of claim 1, wherein said first endplate is disposed in spaced relation to said first end portion.

16. The exhaust system converter of claim 1, wherein said first endplate is flat.

17. An exhaust system converter, comprising:
 a catalyst;
 a first endplate, positioned adjacent to a first end portion of said catalyst, said first endplate defining a first extreme end of said converter and comprising a first endplate support mechanism extending perpendicularly therefrom;

a second endplate, positioned adjacent to a second end portion of said catalyst, said second endplate defining a second extreme end of said converter and comprising a second endplate support mechanism extending perpendicularly therefrom toward said catalyst;

a mat support substantially covering said catalyst, said mat support extending beyond a face of the catalyst over at least a portion of said first endplate support mechanism, wherein said first endplate support mechanism is disposed between said mat support and said catalyst; and a shell disposed around said catalyst and said mat support, and is disposed around and in intimate contact with at least a portion of said first endplate and said second endplate.

18. The exhaust system converter of claim 17, wherein said first endplate support mechanism comprises a first annular ring extending from the first endplate and said second endplate support mechanism comprises a second annular ring extending from a second endplate.

19. The exhaust system converter of claim 18, wherein said mat support substantially covers said first annular ring and said second annular ring.

20. The exhaust system converter of claim 18, wherein said shell extends from a periphery of said first endplate main portion to a periphery of said second endplate main portion.

21. The exhaust system converter of claim 20, wherein said shell extends from about halfway across said periphery of said first endplate to about halfway across said periphery of said second endplate.

22. The exhaust system converter of claim 17, wherein said first endplate is disposed in spaced relation to said first end portion, and said second endplate is disposed in spaced relation to said second end portion.

23. The exhaust system converter of claim 17, wherein said first endplate and said second endplate are flat.

* * * * *